United States Patent [19]

Moody et al.

[11] Patent Number: 4,671,068
[45] Date of Patent: Jun. 9, 1987

[54] ELECTRONIC CONTROL FOR A MOTOR VEHICLE VARIABLE GEOMETRY TURBOCHARGER

[75] Inventors: Joseph F. Moody, Grand Blanc; Ronald D. Yuille, Burton, both of Mich.

[73] Assignee: General Motors Corporation, Detroit, Mich.

[21] Appl. No.: 827,513

[22] Filed: Feb. 10, 1986

[51] Int. Cl.⁴ .............................................. F02B 37/00
[52] U.S. Cl. ..................................................... 60/602
[58] Field of Search .................. 60/600, 601, 602, 603

[56] References Cited

U.S. PATENT DOCUMENTS 4,203,296  5/1980  Tanaka .................................... 60/602

FOREIGN PATENT DOCUMENTS 3507095  9/1985  Fed. Rep. of Germany .
176417  10/1983  Japan ..................................... 60/602

Primary Examiner—Douglas Hart
Attorney, Agent, or Firm—Mark A. Navarre

[57] ABSTRACT

An electronic control for a variable displacement turbocharger (VGT) determines the desired operation of the VGT in accordance with vehicle and engine operating conditions, and positions the VGT control arm to achieve the desired operation. When the engine is operating in a vacuum mode, the control arm is adjusted in open loop fashion; when the engine should be operating in a boost mode, the control arm is adjusted in a closed loop fashion according to the difference between the actual and desired boost.

6 Claims, 4 Drawing Figures

ELECTRONIC CONTROL FOR A MOTOR VEHICLE VARIABLE GEOMETRY TURBOCHARGER

This invention relates to an electronic controller for regulating the operation of a motor vehicle variable geometry turbocharger in response to driver demand and vehicle operating conditions.

Supercharging devices are commonly used in motor vehicle internal combustion engine applications to increase the power output of the engine by boosting the density of the air/fuel mixture. The boost in air/fuel density is effected by a rotary compressor which is directly or indirectly driven by the engine.

A turbocharger is a supercharging device in which the compressor is driven by a turbine, which in turn, is driven by the exhaust gases of the engine. The exhaust gases enter a turbine chamber, are directed across the blades of the turbine wheel by a nozzle, and are discharged from the turbine chamber to an exhaust pipe. The nozzle determines the angle of attack of the gases to control the amount of boost the compressor can provide.

The various components of a turbocharger, including the nozzle, are sized in relation to the engine and the desired performance. However, such sizing inherently entails performance compromises. A system sized for fast response at low engine speeds will not perform well at high engine speeds, and vice versa.

To avoid the performance compromises referred to above, a class of variable geometry turbochargers (VGT) have been developed. The VGT is still sized in relation to the engine and the desired performance, but is variably controlled to regulate the flow or angle of attack of the exhaust gases in the turbine chamber. As a result, the VGT can be controlled in one instance to provide fast response at low engine speeds, and in another instance to provide good power enhancement at high engine speeds.

This invention is directed to an electronic controller for regulating the operation of a VGT in a motor vehicle application. It differs from prior VGT controllers in a number of respects, including increased control accuracy and stability.

The controller of this invention is described in reference to a VGT in which the turbine chamber nozzle comprises a plurality of movable vanes controlled in unison according to the position of an adjustable control member. The control member is positioned by a dual ported pneumatic actuator, which in turn, is controlled by engine vacuum or manifold pressure through a pair of electronically operated variable orifices. The variable orifices are regulated by an electronic controller, which may include both a computer based engine control module for generating a signal representative of the desired operation of the VGT, and a boost controller for suitably controlling the variable orifice devices.

When the engine control module indicates that a boost or pressure mode of operation is desired—that is, a desired manifold pressure in excess of atmospheric pressure—the boost controller effects closed loop adjustment of the control member by continuous comparison of the actual manifold pressure and the desired pressure. In such mode, the variable orifice devices are energized at a level and rate of change determined in relation to the error between the desired and actual pressures so as to reduce the error in a stable and accurate fashion. The signal generated by the engine control unit in the pressure mode is based on engine operating conditions to provide optimized speed of response and power enhancement throughout the engine speed range, and is limited or reduced in a controlled manner whenever excessive engine stress is detected.

When the engine control module signal indicates that a vacuum mode of operation is desired—that is, a manifold pressure at or below atmospheric pressure—the boost controller effects open loop adjustment of the control member, energizing the variable orifice devices in accordance with a predetermined schedule as a function of the signal. In such mode, the signal generated by the engine control module serves to properly position the nozzle vanes for optimizing turbine speed, engine backpressure, manifold vacuum, fuel consumption and engine torque throughout the engine speed range.

Figure 1:
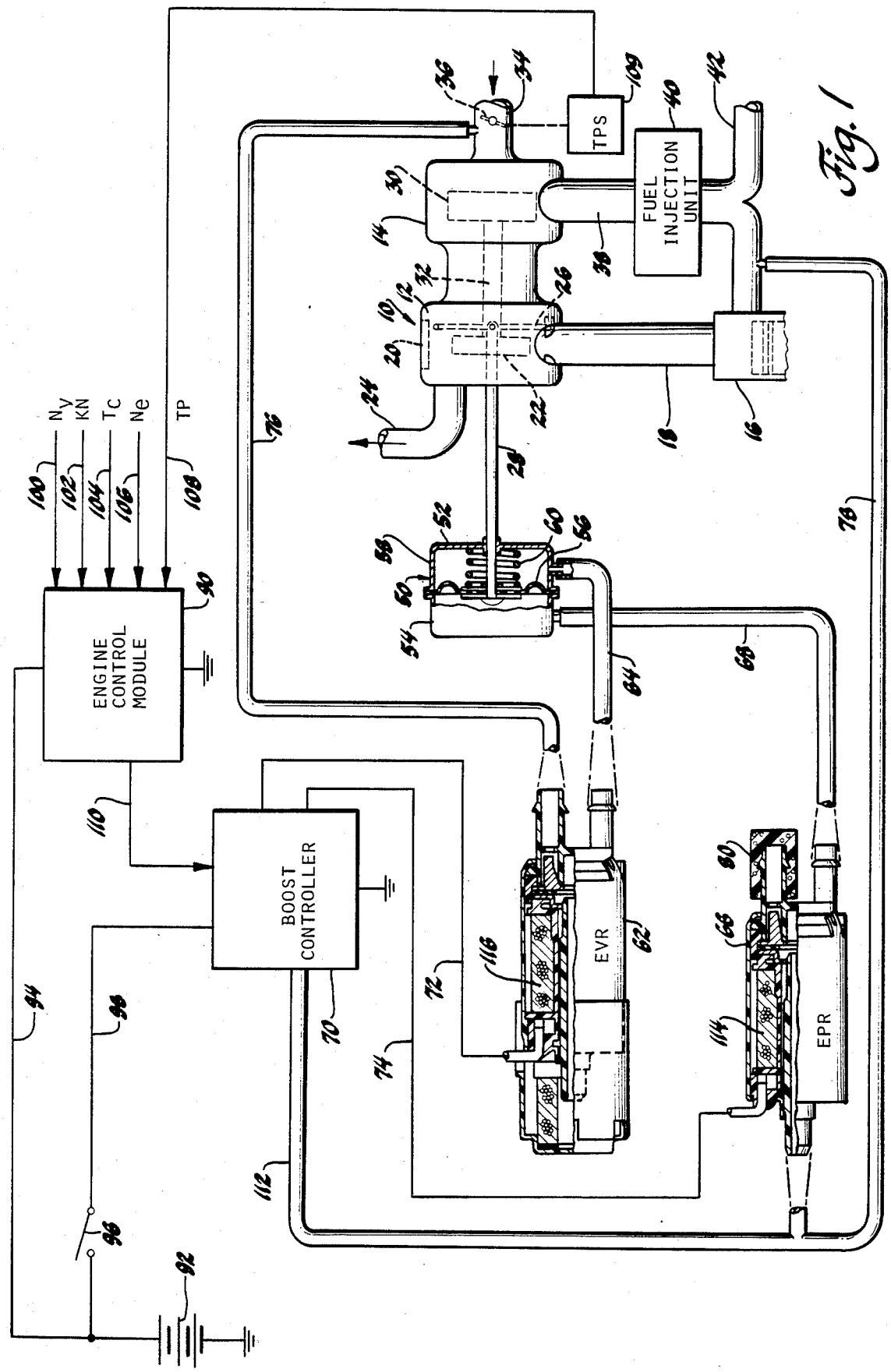
FIG. 1 is a schematic diagram of a system according to this invention in a motor vehicle environment, including a microcomputer based engine control module and a separate boost controller.
Figure 3:
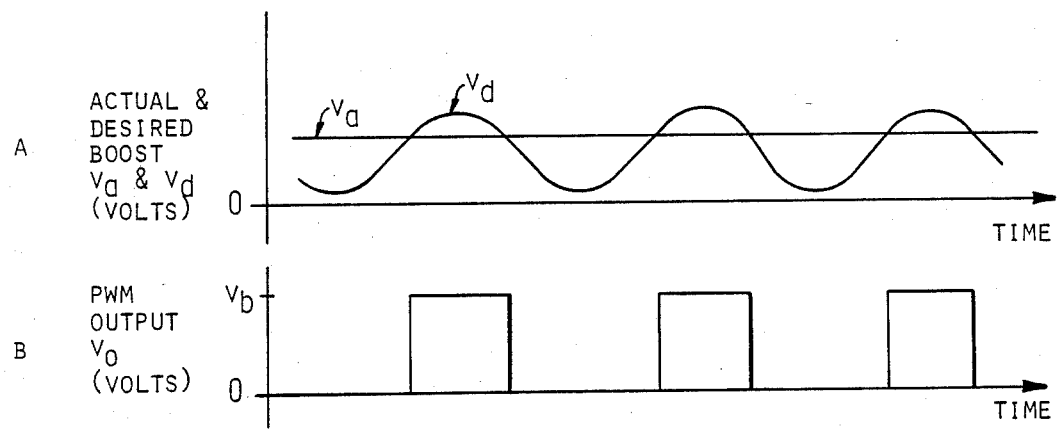

FIG. 3 graphically depicts the operation of the boost controller of FIG. 1 during closed loop control of the manifold pressure.

Figure 4:
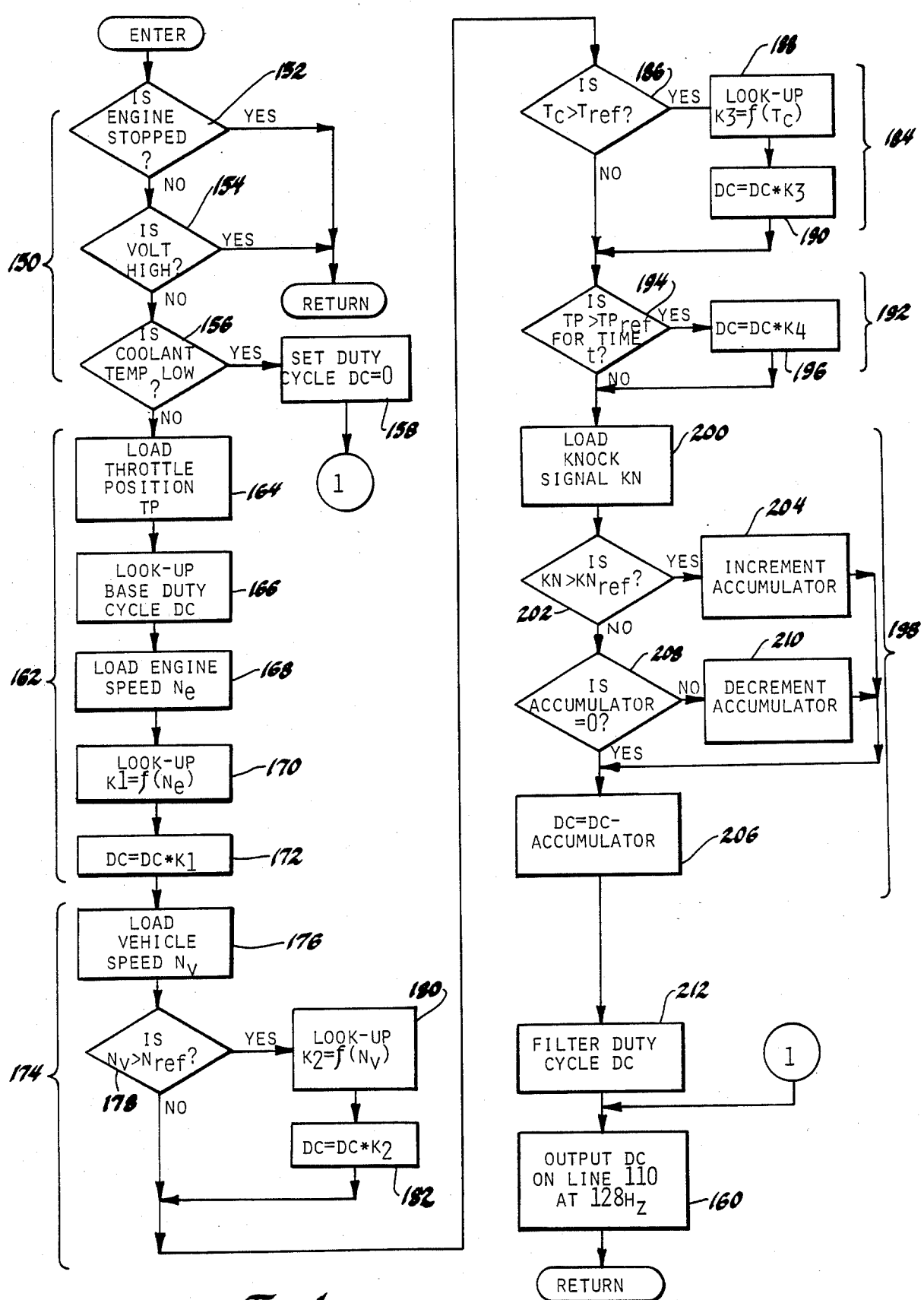

FIG. 4 is a flow diagram representative of the computer program instructions executed by the engine control module of FIG. 1.

Referring now to the drawings, and more particularly to FIG. 1, reference numeral 10 generally designates a variable geometry turbocharger (VGT) of the variable nozzle vane type. The VGT 10 comprises a turbine chamber 12 and a compressor chamber 14.

The turbine chamber 12 receives hot exhaust gases from the cylinders 16 of an internal combustion engine via an exhaust manifold 18. Upon entering the turbine chamber 12, the exhaust gases are directed through circumferentially disposed nozzle vanes 20 onto the blades of a rotary turbine wheel 22. The spent exhaust gases are then discharged from the turbine chamber 12 into an exhaust pipe 24.

The radial angle of the nozzle vanes 20 determine the angle of attack at which the exhaust gases flow into the blades of turbine wheel 22. The angle of the nozzle vanes 20 may be varied by effecting lineal adjustment of the plate 26 via the control arm 28. With the control arm 28 in its leftmost position as shown, the nozzle vanes are nearly closed, causing the exhaust gas angle of attack to be relatively high. This condition maximizes the turbine wheel speed but can also create significant exhaust gas backpressure at higher engine speeds. As the control arm 28 is moved rightward, the nozzle vanes 20 progressively open, causing the angle of attack to becomes progressively lower. This decreases both turbine wheel speed and exhaust gas backpressure.

The turbine wheel 22 rotatably drives a compressor wheel 30 via the shaft 32, the compressor wheel 30 being supported within the compressor chamber 14. The compressor chamber 14 receives combustion air from an intake pipe 34 downstream of an operator positioned throttle 36. The driven compressor wheel 30 is adapted to compress and discharge air at greater than atmospheric pressure into an outlet pipe 38. Fuel is injected into the compressed air by the fuel injection unit 40, and the air/fuel mixture is directed to the engine cylinders 16 via an intake manifold 42.

Variable geometry turbochargers generally meeting the above description are commercially available from Aerodyne Dallas Corporation, Dallas, Tex.

The control arm 28 of VGT 10 is axially positioned by a dual port actuator 50. The actuator 50 is divided into a vacuum chamber 52 and a pressure chamber 54 by diaphragm 56, which is sealed against the interior periphery of the actuator housing 58. The control arm 28 is mounted on the diaphragm 56, and moves axially therewith. A spring 60 disposed between the diaphragm 56 and the actuator housing on the vacuum chamber side urges the diaphragm 56 and the control arm 28 in a leftward direction.

The position of the control arm 28 is determined by the force exerted by spring 60 and by the force due to the pneumatic pressure differential across the diaphragm 56. The pneumatic pressure in the vacuum chamber 52 is controlled by an electronic vacuum regulator (EVR) 62 via line 64, and the pneumatic pressure in pressure chamber 54 is controlled by an electronic pressure regulator (EPR) 66 via line 68. A boost controller 70, described below in reference to FIGS. 2-3, electrically controls the operation of EVR 62 and EPR 66 via lines 72 and 74, respectively.

Both the EVR 62 and the EPR 66 are conventional solenoid devices comprising an axially movable armature, a spring which biases the armature toward one extreme axial position, and an electrical coil which, when energized with electrical current, biases the armature to the other extreme axial position. In practice, the electrical coils are pulse-width-modulated by the boost controller 70 so that the respective armatures achieve some average axial position. In EVR 62, the armature alternately connects and disconnects the vacuum chamber 52 with the intake pipe 34 on the downstream side of throttle 36 via line 76. As a result, the EVR 62 operates as a variable orifice between vacuum chamber 52 and intake pipe 34. In EPR 66, the armature alternately connects the pressure chamber 54 with the intake manifold 42 via line 78 and atmospheric pressure via vent 80. As a result, the EPR 66 operates as a variable orifice between pressure chamber 54 and intake manifold 42.

The engine is operable in either a vacuum mode wherein substantially no boost is provided by the VGT 10, or a pressure (boost) mode wherein the VGT 10 compresses the intake air in excess of atmospheric pressure. When the engine is in the vacuum mode of operation, the EPR 66 is deenergized to vent the pressure chamber 54 to atmospheric pressure, and the EVR 62 is pulse-width-modulated to regulate control arm displacement. When the engine is operating in the pressure (boost) mode of operation, the EVR 62 is deenergized to disconnect intake pipe 34 from the vacuum chamber 52, and the EPR 66 is used to regulate control arm displacement. In both cases, increases in the effective orifice open the nozzle vanes 20 to decrease the boost, and decreases in the effective orifice close the nozzle vanes 20 to increase the boost.

Electronically, the control system of this invention includes a microcomputer based engine control module (ECM) 90, and a boost controller 70. The ECM 90 receives operating current directly from the vehicle storage battery 92 via line 94, and the boost controller 70 receives operating current from battery 92 through an ignition switch 96 via line 98.

The ECM 90 receives inputs on lines 100-108 relating to the vehicle speed $N_v$, the presence of premature engine detonation (knock) K, the engine coolant temperature $T_c$, the engine speed $N_e$, and the throttle position TP. The signals on lines 100-108 are generated with conventional transducers, the throttle sensor 109 being the only such transducer depicted in FIG. 1. The ECM 90 determines the desired operation of the VGT 10 based on the various input signal values, and outputs a pulse-width-modulated signal in accordance therewith on line 110.

The boost controller 70 receives the ECM output signal on line 110 as an input, and energizes EVR 62 and EPR 66 via lines 72 and 74 so that the desired operation of VGT 10 is achieved. When the engine is operating in the vacuum mode, the duty cycle of the input signal corresponds to the desired position of the nozzle vanes 20, and boost controller 70 energizes the EVR 62 in an open loop manner according to a predetermined schedule to achieve the desired operation. When the engine is operating in the boost mode, the input signal corresponds to the desired intake manifold pressure, and boost controller 70 energizes EPR 66 in a closed loop manner to achieve the desired operation. A pipe 112 connects the boost controller 70 with the intake manifold 42 to facilitate the closed loop control of EPR 66.

Figure 2:
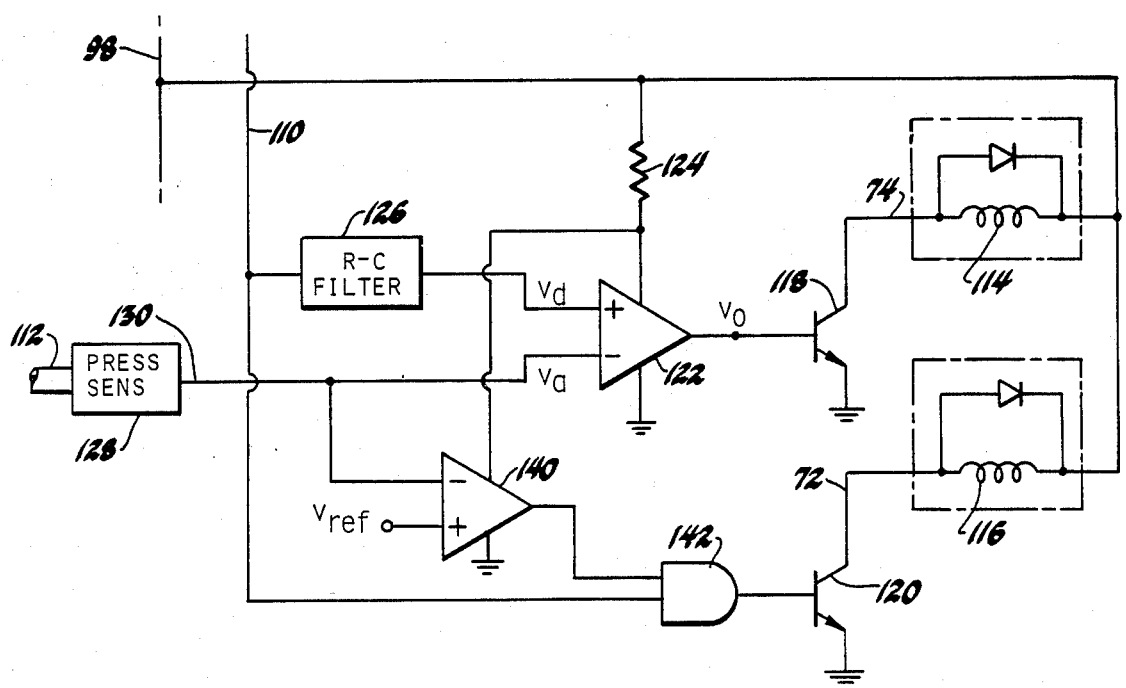
FIG. 2 is a schematic circuit diagram of the boost controller of FIG. 1.

FIG. 2 shows the boost controller 70 of FIG. 1 in greater detail. Accordingly, elements common to both FIGS. 1 and 2 have been assigned the same reference numerals. Apart from boost controller 70, the reference numeral 114 designates the electrical coil of EPR 66, and the reference numeral 116 designates the electrical coil of EVR 62. The coils 114 and 116 are each connected at one end to the power supply line 98. The other end of coil 114 is connected to ground through the collector-emitter circuit of transistor 118, and the other end of coil 116 is connected to ground through the collector-emitter circuit of transistor 120.

The conduction of transistor 118, and hence the energization of EPR coil 114, is controlled by comparator 122, whose output voltage is designated as $V_o$. The power supply line 98 is connected to the power input of comparator 122 through resistor 124, and the voltage $V_o$ switches between battery voltage $V_b$ and ground voltage in accordance with the relative voltage magnitudes applied to its inverting and noninverting inputs. The pulse-width-modulated input signal on line 110 is filtered by an RC filter 126 to generate a generally sinusoidal voltage $V_d$ which is applied to the noninverting input of comparator 122. A pressure transducer 128 receives the pipe 112 and generates a voltage $V_a$ in accordance with the pressure therein on line 130, such line being connected to the inverting input of comparator 122.

The operation of the comparator 122 and the corresponding energization of EPR 66 is graphically depicted in Graphs 3A and 3B, which have a common time base. Graph 3A depicts the voltages $V_a$ and $V_d$ for a steady state control condition, and Graph 3B depicts the comparator output voltage $V_o$. Whenever the voltage $V_d$ corresponding to the desired manifold boost pressure exceeds the voltage $V_a$ corresponding to the actual boost pressure, the output voltage $V_o$ assumes its high voltage state. In such case, the transistor 118 is biased conductive to energize the electrical coil 114 of EPR 66. When the voltage $V_d$ is lower than the voltage $V_a$, the output voltage $V_o$ assumes its low voltage state. In such case, the transistor 118 is biased nonconductive to deenergize the electrical coil 114. This operation results in an energization duty cycle such as shown in Graph 3B for effectively creating a variable orifice between the pressure chamber 54 and the intake pipe 34 which causes the actual manifold boost to correspond with the desired boost.

The closed loop control system set forth above has the advantage that the control arm displacement rate depends on the magnitude of the error between the actual and desired boost pressures. Relatively large error produces relatively fast movement of the control arm 28; relatively small error produces relatively slow movement of the control arm 28. In other words, the closer the boost is to the desired level, the slower the corrective movement of control arm 28. This feature contributes to stable operation of the system, especially in control regions where small changes in control arm displacement produce relatively large changes in boost pressure.

The relative magnitudes of the voltages $V_a$ and $V_d$ are such that $V_d$ can only exceed $V_a$ when the input signal on line 110 calls for a desired pressure in excess of atmospheric pressure—that is, whenever the input signal indicates that the engine should be operating in a boost mode. When the input signal indicates that the engine should be operating in a vacuum mode, the comparator 122 is maintained in its low output voltage state, inhibiting the energization of EPR coil 114.

The conduction of transistor 120, and hence the energization of the EVR 62, is controlled by a combination of the input signal on line 110 and the comparator 140. The input signal on line 110 is connected to one input of AND gate 142 and the output of comparator 140 is connected to the other input of AND gate 142. The output of AND gate 142 is connected directly to the base of transistor 120 for controlling its conduction. Whenever the comparator 140 is in its high output voltage state, transistor 120 is biased conductive and nonconductive in accordance with the duty cycle of the input signal on line 110. Whenever the comparator 140 is in its low output voltage state, the transistor 120 is biased nonconductive regardless of the input signal on line 110.

The inverting input of comparator 140 is connected to the output of pressure transducer 128 on line 130, and the noninverting input is connected to a reference voltage $V_{ref}$ corresponding to atmospheric pressure. Thus, the output of comparator 140 is high to enable pulse-width-modulation of the EVR coil 116 whenever the actual pressure in intake manifold 42 is less than atmospheric pressure—that is, whenever the engine is operating in a vacuum mode. On the other hand, the output of comparator 140 is low to inhibit energization of EVR coil 116 whenever the actual pressure in intake manifold 42 is greater than atmospheric pressure—that is, whenever the engine is operating in a boost mode.

In view of the above, it will be understood that the boost controller 70 automatically switches between open loop and closed loop regulation of the control arm 28. Whenever the engine is actually operating in a vacuum mode, the output of comparator 140 is high, and the EVR 62 is pulse-width-modulated in open loop fashion according to the duty cycle of the input signal on line 110. So long as the input signal on line 110 indicates that the engine should be operating in a vacuum mode, the output of comparator 122 is low, and EPR 66 remains deenergized. However, when the input signal on line 110 indicates that the engine should be operating in a boost mode, the output of comparator 122 cycles high and low as depicted in FIG. 3 to pulse-width-modulate EPR 66 in closed loop fashion for achieving the desired boost pressure. As soon as the manifold pressure actually exceeds atmospheric pressure, the engine is no longer operating in a vacuum mode, and the output of comparator 140 falls to its low state, deenergizing the EVR 62. When the duty cycle of the input signal on line 110 subsequently indicates that the engine should be operating in a vacuum mode, the output of comparator 122 remains low, and the EPR 66 becomes deenergized. When the manifold pressure actually falls below atmospheric pressure, the output of comparator 140 goes high, and the EVR 62 is once again pulse-width-modulated in open loop fashion to achieve the desired control.

The flow diagram of FIG. 4 is representative of program instructions executed by the ECM 90 for determining the desired operation of VGT 10 and generating an output signal on line 110 in accordance therewith. Obviously, the ECM 90 is concerned with many other engine and vehicle control tasks, including control of the fuel injection unit 40. As such, the flow diagram of FIG. 4 is periodically executed as a separate control subroutine. The enter block indicates initiation of the subroutine; the return blocks indicate completion of the subroutine and reexecution of other control functions.

The blocks designated by the reference numeral 150 check entry level conditions to determine if VGT control is appropriate. The decision block 152 determines if the engine is stopped and decision block 154 determines if the battery voltage is abnormally high. If either is answered in the affirmative, no output signal is applied to line 110, and the ECM 90 is returned to execute other control functions. If both decision blocks 152 and 154 are answered in the negative, the decision block 156 is executed to determine if the coolant temperature signal $T_c$ indicates that the engine is cold. If so, instruction blocks 158 and 160 are executed to set the duty cycle DC equal to zero and to output the duty cycle DC on line 110 at a frequency of 128 Hz. If the engine is not cold, a different duty cycle DC may be appropriate, and the remainder of the routine is executed.

The blocks designated by the reference numeral 162 determine a duty cycle DC corresponding to a desired boost pressure or nozzle vane position as a function of the throttle position signal TP and the engine speed signal $N_e$ in accordance with empirically derived schedules. The schedules are conveniently stored within ECM 90 in the form of look-up tables. First, the instruction blocks 164–166 are executed to determine a base duty cycle DC in accordance with the throttle position signal TP. Throttle position is the primary indication of operator demand, and the duty cycle varies substantially in direct relation therewith. Then, the instruction blocks 168–170 are executed to determine a duty cycle modifier K1 as a function of the engine speed signal $N_e$. At instruction block 172, the modifier K1 is applied to the base duty cycle in multiplicative fashion as shown. The modifier K1 has the effect of increasing the duty cycle (and therefore closing the nozzle vanes 20) when the engine is at idle to increase off-idle response, and/or decreasing the duty cycle at relatively high engine speeds to prevent engine damage.

The blocks designated by the reference numeral 174 serve to correct the duty cycle DC for high vehicle speed if necessary. If the vehicle speed signal $N_v$ indicates a vehicle speed in excess of a threshold value $N_{ref}$, as determined by the blocks 176-178, the instruction blocks 180-182 are executed to determine a duty cycle modifier K2 as a function of the speed $N_v$ and to apply the modifier K2 to the duty cycle DC in multiplicative fashion as shown. The modifier K2 is typically less than unity, and serves to open the nozzle vanes 20 at vehicle speeds indicative of cruising, thereby increasing the engine operating efficiency by reducing the exhaust gas backpressure.

The blocks designated generally by the reference numeral 184 serve to adjust the duty cycle DC for engine temperature if necessary. If the coolant temperature signal $T_c$ indicates an engine temperature in excess of a threshold value $T_{ref}$, as determined by decision block 186, the instruction blocks 188-190 are executed to determine a duty cycle modifier K3 as a function of the coolant temperature $T_c$, and to apply the modifier K3 to the duty cycle DC in multiplicative fashion as shown. The modifier K3 is less than unity, and serves to protect the engine by reducing the boost level when the engine is hot.

The blocks designated generally by the reference numeral 192 serve to adjust the duty cycle DC in prolonged high demand conditions. If the throttle position signal TP exceeds a threshold $TP_{ref}$ for a predetermined time interval, such as twenty (20) seconds, as determined by decision block 194, the instruction block 196 is executed to apply a predetermined duty cycle modifier K4 to the duty cycle DC in multiplicative fashion as shown. The modifier K4 is significantly less than unity, and serves to protect the engine by reducing the desired boost.

The blocks designated generally by the reference numeral 198 serve to correct the duty cycle DC for premature engine detonation, or knocking, if necessary. If the knock signal K indicates engine knocking in excess of a reference $K_{ref}$, as determined by the blocks 200-202, the instruction blocks 204 and 206 are executed to increment an accumulator and to subtract the accumulator contents from the duty cycle DC. If decision block 202 is answered in the negative, and the contents of the accumulator is non-zero (as determined by decision block 208), the instruction blocks 210 and 206 are executed to decrement the accumulator and to subtract the accumulator contents from the duty cycle DC. The accumulator contents which reduces the scheduled duty cycle is incremented with each execution of the subroutine so long as the sensed knocking persists, and is only decremented to zero after a similar interval of operation without sensed knocking. Knocking is significantly detrimental to the engine, and the routine described herein quickly reduces the scheduled boost when knocking is detected. The boost is returned to the scheduled value only after a similar interval of operation without knocking.

The instruction block 212 applies a first order lag filter to the duty cycle DC to prevent overly abrupt changes in the desired boost signal, and the instruction block 160 outputs the filtered duty cycle on line 110 at a frequency of 128 Hz as described above.

In summary, the control system of this invention effects stable and accurate control of the VGT 10. The duty cycle of the control signal varies from one extreme calling for maximum boost to the other extreme calling for minimum exhaust gas backpressure. Various engine operating conditions are taken into account in the determination of the control signal duty cycle, throttle position, engine speed, vehicle speed, engine temperature, and knocking.

When the engine is operating in a vacuum mode and no boost is desired, the control signal duty cycle indicates the optimum position of the nozzle vanes 20 for maximizing engine operating efficiency and boost response time. Thus, the duty cycle is relatively low to effect substantial opening of the vanes 20 to reduce exhaust gas backpressure under cruising conditions, and relatively high to effect substantial closing of the vanes 20 to increase turbine speed under idle conditions. In this mode, the boost controller 70 positions the vanes 20 in open loop fashion according to the control signal duty cycle.

When it is desired to operate the engine in a boost mode, or boost mode operation is anticipated (as at idle), the control signal duty cycle indicates the desired boost pressure. In such case, the boost controller 70 positions the vanes 20 in closed loop fashion according to the boost pressure error. The stability of the control in such mode is enhanced by causing the rate of control arm movement to vary in relation to the boost pressure error. Large boost pressure error results in relatively fast control arm movement; small boost pressure error results in relatively slow control arm movement.

The boost controller 70 automatically switches from open loop to closed loop operation when the control signal indicates that boost mode operation is desired and the transducer 128 indicates a transition from vacuum to pressure. Similarly, the controller 70 automatically switches from closed loop to open loop operation when the control signal indicates that vacuum mode operation is desired and the transducer 128 indicates a transition from pressure to vacuum.

While this invention has been described in reference to the illustrated embodiment, it is recognized that other arrangements might also be used. For example, a single control unit could perform the functions of both the boost controller 70 and the ECM 90, if desired. Further, a different type of VGT (such as an adjustable plate device) could be used. Various other modifications may occur to those skilled in the art, and it will be understood that systems incorporating the above and such other modifications may fall within the scope of this invention, which is defined by the appended claims.

The embodiments of the invention in which an exclusive property or privilege is claimed are defined as follows:

1. In a motor vehicle power plant including a combustion engine, an engine exhaust gas driven turbocharger adapted to boost the pressure of a combustible mixture supplied to the engine, and an adjustable turbocharger control mechanism for effectively varying the turbocharger geometry to provide increased or decreased boost for a given engine operating condition, a method of adjusting the control mechanism, comprising the steps of:

sensing the actual pressure of the combustible mixture supplied to the engine;

determining based on said sensed pressure whether the engine is operating in a vacuum mode wherein the pressure of the mixture is less than atmospheric pressure, or a boost mode wherein the turbocharger boosts the pressure of the mixture above atmospheric pressure;

generating a control signal in accordance with sensed engine and vehicle conditions, the control signal having a characteristic representative (1) of a desired turbocharger geometry for satisfying engine performance and efficiency criteria when the sensed conditions indicate that the engine should be operating in the vacuum mode, and (2) of the desired pressure of the combustible mixture when the sensed conditions indicate that the engine should be operating in the boost mode; and controlling the turbocharger geometry by open loop adjustment of the control mechanism in accordance with the control signal characteristic when it is determined that the engine is operating in the vacuum mode and by closed loop adjustment of the control mechanism in accordance with the difference between the desired pressure represented by the control signal characteristic and the sensed pressure when it is determined that the engine should be operating in the boost mode.

2. The method set forth in claim 1, wherein the motor vehicle power plant includes a sensor for detecting premature detonation in the engine, and wherein the method includes the additional steps of:

adjusting the control signal in accordance with the value of a control signal modifier so as to effect a reduction in the desired intake gas pressure represented by the control signal;

increasing the value of the control signal modifier in response the detection of significant premature detonation and so long as such detection persists, thereby to reduce the pressure of the intake gas supplied to the engine below that which would otherwise occur to prevent engine damage; and decreasing the value of the control signal modifier at a predetermined rate in the absence of detected significant premature detonation, thereby to progressively return the intake gas pressure to its vehicle operating condition dependent value.

3. A method as set forth in claim 1, wherein the closed loop adjustment of the turbocharger control mechanism is carried out such that the rate of adjustment is varied in direct relation to the magnitude of the difference between the sensed pressure and the desired pressure represented by the control signal characteristic, thereby to improve the stability of the control.

4. In a motor vehicle power plant including a combustion engine having an intake passage for receiving intake air at atmospheric pressure, an engine exhaust gas driven turbocharger adapted to elevate the pressure of the intake air and to supply combustion air to the engine at such elevated pressure, and an adjustable position turbocharger control mechanism for effectively varying the turbocharger geometry to provide increased or decreased pressure elevation for a given engine operating condition, apparatus comprising:

means for generating a geometry command signal in accordance with sensed engine and vehicle operating conditions, such signal having a characteristic representative (1) of a desired turbocharger geometry when the sensed operating conditions indicate that the engine should be operating in a vacuum mode wherein the combustion air supplied to the engine is less than atmospheric pressure, and (2) of the desired combustion air pressure when the sensed conditions indicate that the engine should be operating in a boost mode wherein the combustion air is boosted above atmospheric pressure;

servo means adapted to receive first and second opposing control signals for positioning the adjustable turbocharger control mechanism in offset relation to the resultant thereof;

closed loop means effective when the geometry command signal is representative of the desired combustion air pressure to generate a first control signal for said servo means in relation to the difference between the actual pressure of the combustion air and the desired combustion air pressure represented by the command signal characteristic; and open loop means effective whenever the actual pressure of the combustible mixture is less than atmospheric pressure to generate a second control signal for said servo means in direct relation to the desired turbocharger geometry represented by the geometry command signal.

5. Apparatus as set forth in claim 4, wherein
the servo means comprises first and second chambers separated by a diaphragm connected to the adjustable control member;
the closed loop means comprises an effective variable orifice through which the combustion air pressure communicates with the first chamber of the servo means; and
the second means comprises an effective variable orifice through which the intake air in the intake passage communicates with the second chamber of the servo means.

6. In a motor vehicle power plant including a combustion engine which receives intake gases for combustion and discharges exhaust gases following combustion, an exhaust driven turbocharger for receiving atmospheric gases and boosting the pressure thereof to supply intake gases to the engine at a pressure determined in relation to the energy imparted to the turbocharger by the exhaust gases, and variable geometry means comprising a plurality of positionable vanes which vary the amount of energy imparted to the turbocharger by the exhaust gases, a method of positioning the variable geometry vanes, comprising the steps of:

generating a control signal in accordance with sensed vehicle operating conditions, the control signal having a characteristic representative (1) of a vane position for satisfying engine performance and efficiency criteria when the sensed operating conditions indicate that the engine should be operating in a vacuum mode wherein the pressure of the intake gases is at or less than atmospheric pressure, and (2) of the desired pressure of the intake gases when the sensed operating conditions indicate that the engine should be operating in a boost mode wherein the pressure of the intake gases is boosted above atmospheric pressure; and positioning the variable geometry vanes (1) in open loop fashion according to the desired vane position represented by the control signal when the actual intake gas pressure is at or less than atmospheric pressure, and (2) in closed loop fashion according to the difference between the actual intake gas pressure and the desired intake gas pressure represented by the control signal when the desired intake gas pressure is above atmospheric pressure.

* * * * *